US012715649B2

(12) United States Patent
Weng et al.

(10) Patent No.: US 12,715,649 B2
(45) Date of Patent: Aug. 25, 2026

(54) PACKAGING BOX AND PRODUCTION PROCESS THEREOF

(71) Applicant: Taizhou NingZe Tech Plastic Mould and Technology Co., Ltd., Taizhou City (CN)

(72) Inventors: Zeguo Weng, Taizhou City (CN); Songguo Weng, Taizhou City (CN)

(73) Assignee: Taizhou NingZe Tech Plastic Mould And Technology Co., Ltd., Taizhou City (CN)

( * ) Notice: Subject to any disclaimer, the term of this patent is extended or adjusted under 35 U.S.C. 154(b) by 0 days.

(21) Appl. No.: 18/731,548

(22) Filed: Jun. 3, 2024

(65) Prior Publication Data

US 2025/0326521 A1 Oct. 23, 2025

(30) Foreign Application Priority Data

Apr. 22, 2024 (CN) ......................... 202410482069.6

(51) Int. Cl.

*B65D 6/34* (2006.01)
*B29D 22/00* (2006.01)
*B29K 67/00* (2006.01)

(Continued)

(52) U.S. Cl.

CPC ............ *B65D 11/26* (2013.01); *B29D 22/003* (2013.01); *B65D 11/10* (2013.01);

(Continued)

(58) Field of Classification Search

CPC ...... B65D 11/26; B65D 22/003; B65D 11/10; B65D 43/0204; B65D 2543/00194;

(Continued)

(56) References Cited

U.S. PATENT DOCUMENTS 2,757,851 A * 8/1956 Arlington .............. B65D 5/324 229/125.17
3,381,879 A * 5/1968 Belcher .................. B65D 1/225 220/519

(Continued)

FOREIGN PATENT DOCUMENTS

EP 1650134 A2 * 4/2006 ............. B65D 5/563
WO WO-2022063445 A1 * 3/2022 ............... B65D 1/22

OTHER PUBLICATIONS

English translation of WO 2022063445 (Year: 2022).*

*Primary Examiner* — Nathan J Jenness
*Assistant Examiner* — Eric C Baldrighi
(74) *Attorney, Agent, or Firm* — Bay State IP, LLC

(57) ABSTRACT

The present disclosure relates to a novel packaging box. The novel packaging box includes a cover body and a box body; the cover body is detachably buckled with the box body; the cover body includes a cover sheet material and a first buckle part; the first buckle part is formed by injection molding at the edge of the surface of the cover sheet material; the box body includes a box sheet material, a second buckle part, and angle frames; the box sheet material includes a bottom surface and four side surfaces connected to the bottom surface; the box sheet material is formed into a box by folding four side surfaces; four corners of the box are fixed and sealed through the angle frames; an edge of an opening part of the box are connected to the second buckle part; the second buckle part is connected to the various angle frames.

5 Claims, 4 Drawing Sheets

(51) Int. Cl.
*B65D 6/00* (2006.01)
*B65D 43/02* (2006.01)

(52) U.S. Cl.
CPC .. *B65D 43/0204* (2013.01); *B29C 2793/0081* (2013.01); *B29K 2067/046* (2013.01); *B65D 2543/00194* (2013.01); *B65D 2543/00648* (2013.01); *B65D 2543/00685* (2013.01); *B65D 2543/00759* (2013.01); *B65D 2543/00796* (2013.01)

(58) Field of Classification Search
CPC ........... B65D 2543/00648; B65D 2543/00685; B65D 2543/00759; B65D 2543/00796; B65D 42/162; B65D 1/26; B65D 43/08; B65D 53/00; B29C 2793/0081; B29C 45/14336; B29K 2067/046; B29L 2031/7162
USPC .......................................................... 220/780
See application file for complete search history.

(56) References Cited

U.S. PATENT DOCUMENTS 6,349,877 B1 * 2/2002 Bradford .............. B65D 5/0055 229/199
2006/0011634 A1 * 1/2006 Shibata .................. B65D 11/02 220/485
2014/0117025 A1 * 5/2014 Minnette ................ B65D 25/54 220/592.01
2023/0150713 A1 * 5/2023 Rosell ..................... B32B 27/08 229/199
2024/0092529 A1 * 3/2024 Austrheim ............... B65D 7/32

* cited by examiner

PACKAGING BOX AND PRODUCTION PROCESS THEREOF

CROSS REFERENCE TO RELATED APPLICATION

The application claims the benefit of and takes priority from Chinese Patent Application No. 202410482069.6 filed on Apr. 22, 2024, the contents of which are herein incorporated by reference.

TECHNICAL FIELD

The present disclosure relates to the field of packaging boxes, and in particular, to a novel packaging box and a production process thereof.

BACKGROUND

A plastic packaging box, also referred to as a lunch box or a vegetable box, is used for packaging meals. A traditional plastic packaging box includes a box body and a cover body. The cover body is provided with a first buckle part; the cover body and the first buckle part are integrally formed by plastic; the box body is provided with a second buckle part; the box body and the second buckle part are integrally formed by plastic; the cover body and the box are detachably buckled by the first buckle part and the second buckle part; a wall thickness of each of the cover body (excluding the first buckle part) and the box body (excluding the second buckle part) is generally around 50 to 100 decimillimeters, so that it is very thin.

For existing plastic, such as phenylalaninammo-nialyase (PAL), polyethylene terephthalate (PET), ethylene/vinyl alcohol copolymer (EVOH), polystyrene (PS), polyethylene (PE), polycarbonate (PC), and polymethyl methacrylate (PMMA), which has poor injection molding flowability, material shortage is easily caused during integrated injection molding. Therefore, the present disclosure aims to provide a new production process that combines film and injection molding to ensure the integrity of a product and a new packaging box structure.

SUMMARY

For the shortcomings in the prior art, the present disclosure aims to at least solve the technical problems in the prior art to a certain extent and provide a new packaging box structure to solve the problem that material shortage is easily caused at a thin part during integrated injection molding of existing plastic with poor flowability.

To provide a new packaging box structure that is entirely prepared from a degradable material, a specific technical solution is as follows:

A novel packaging box includes a cover body and a box body, wherein the cover body is detachably buckled with the box body; the cover body includes a cover sheet material and a first buckle part; the first buckle part is arranged at an edge of a surface of the cover sheet material; the first buckle part is formed by injection molding at the edge of the surface of the cover sheet material;

the box body includes a box sheet material, a second buckle part, and angle frames; the box sheet material includes a bottom surface and four side surfaces connected to the bottom surface; the box sheet material is formed into a box by folding four side surfaces; four corners of the box are fixed and sealed through the angle frames; an edge of an opening part of the box are connected to the second buckle part; the second buckle part is connected to the various angle frames; the second buckle part and the angle frames are integrally formed by injection molding; the second buckle part is formed at the opening part of the box by injection molding; and the angle frames are formed at the four corners of the box by injection molding.

Further, the first buckle part is in a frame shape; an outer contour of the first buckle part is the same as an outer contour of the cover sheet material; and after forming, a surface of the first buckle part is fused together with a circumferential edge of the cover sheet material.

Further, the second buckle part is in a frame shape and has a circumferential flange; and the circumferential flange is fused together with the edge of the opening part of the box.

Further, each angle frame includes a side frame and a bottom frame; the side frame is fused with edges of two corresponding adjacent side surfaces; and the bottom frame is fused with bottom edges of two corresponding adjacent side surfaces and corresponding corner edges of the bottom surface.

Further, the bottom surface is square; four corners of the bottom surface have fillets; two ends of a side surface extend outwards to any adjacent two side surfaces; after folding, the two ends are fused together with the side frame along the corresponding fillets to seal junctions of the four side surfaces; the bottom frame is in an arc shape; and the bottom frame is fused together with bottom edges of end portions of two corresponding adjacent side surfaces and edges of the corresponding fillets of the bottom surface to seal junctions of the four corners.

Further, reinforcing blocks are arranged at four corners of the second buckle part; the reinforcing blocks are respectively connected to the circumferential flanges and the corresponding angle frame; two sides of the side surfaces are provided with unfilled corners; and the unfilled corners of the two sides formed by folding two adjacent side surfaces form gaps that are matched with shapes of the reinforcing blocks.

Further, first flush stiffening ribs are arranged on the side frames; second flush stiffening ribs are arranged on the bottom frames; the first flush stiffening ribs are intersected with the second flush stiffening ribs; after folding, the edges of two adjacent side surfaces resist against two sides of the corresponding first flush stiffening ribs; bottom edges of the end portions of the two adjacent side surfaces resist against upper sides of the corresponding second flush stiffening ribs; and edges of the fillets of the bottom surface resist against lower sides of the corresponding second flush stiffening ribs.

Further, a thickness of the cover sheet material is 2 decimillimetres to 35 decimillimetres; and a thickness of the box sheet material is 2 decimillimetres to 35 decimillimetres.

The problem that material shortage is easily caused at a thin part during integrated injection molding of existing plastic with poor flowability is solved. A specific technical solution is as follows:

A production process for a cover body of a packaging box specifically includes the following steps:

a: manufacturing a mold, and mounting the mold in an injection molding machine;

b: obtaining a cover sheet material with a corresponding size by cutting, wherein a thickness of the cover sheet material is 2 decimillimetres to 35 decimillimetres;

c: opening the mold, and placing the cover sheet material into the mold;

d: closing the mold, control a surface temperature in a mold cavity at 150° C. to 250° C., and injecting plastic into the injection molding machine for molding time of 0.5 S to 5 S; and c: obtaining a finished cover body.

The problem that material shortage is easily caused at a thin part during integrated injection molding of existing plastic with poor flowability is solved. A specific technical solution is as follows:

A production process for a box body of a packaging box specifically includes the following steps:

A: manufacturing a mold, and mounting the mold in an injection molding machine;

B: obtaining a box sheet material with a corresponding size by cutting, wherein a thickness of the box sheet material is 2 decimillimetres to 35 decimillimetres;

C: opening the mold, and placing the box sheet material into the mold;

D: closing the mold, controlling a surface temperature in a mold cavity at 150° C. to 250° C., and injecting polylactic acid (PLA) into the injection molding machine for molding for molding time of 0.5 S to 5 S; and E: obtaining a finished box body.

The technical effects of the present disclosure mainly lies in the following aspects: 1. The first buckle part is formed on the cut cover sheet material by injection molding; the thickness of the cover sheet material is 2 decimillimetres to 35 decimillimetres; the second buckle part and the angle frames are integrally formed on the cut box sheet material; the thickness of the box sheet material is 2 decimillimetres to 35 decimillimetres; for example, the cover sheet material and the box sheet material are made of a PLA material; the first buckle part, the second buckle part, and the angle frames are formed by PLC injection molding; all the materials are degradable, which achieves a degradable packaging box; for example, the cover sheet material and the box sheet material are conventional plastic, and the first buckle part, the second buckle part, and the angle frames are formed by injection molding of conventional plastic; the packaging box has a thinner wall; and raw materials are saved.

2. Fused connection and sealing are achieved through the side frames and the two corresponding side edges, and fused connection sealing are achieved through the bottom frames and the corresponding bottom corners.
3. Considering that there is a gap after the edges of two adjacent side surfaces resist against each other after folding, the first flush stiffening ribs are provided. The side surfaces and the bottom surface have thicknesses. Considering that the edges of two adjacent side surfaces and the edges of the fillets of the bottom surface after folding may form a space, the second flush stiffening ribs are provided. This ensures the flatness of corner connections, thus ensuring the exterior flatness. The external shape is close to a shape of a product formed by the traditional plastic at a time.
4. The product produced by the process of the present disclosure can be entirely prepared from the degradable material, thus achieving a degradable packaging box. Or, the product may be prepared from the conventional plastic. The packaging box has a thin wall, which saves the raw materials.
5. The product produced by the process of the present disclosure has an appearance effect that is infinitely close to the appearance effect achieved by one-time forming of the traditional plastic. This ensures that connectors (the angle frames) for sealing will not have material shortage.

DETAILED DESCRIPTION OF THE EMBODIMENTS

The embodiments of the present disclosure are described in detail below to explain the present disclosure, so that the technical solutions of the present disclosure are easier to understand and master, and will not be understood as limitations on the present disclosure.

Embodiment 1

To provide a new packaging box structure that is entirely prepared from a degradable material, a specific technical solution is as follows:

As shown in FIG. 1, FIG. 2, FIG. 3, and FIG. 4, a novel packaging box includes a cover body 1 and a box body 2, wherein the cover body 1 is detachably buckled with the box body 2; the cover body 1 includes a cover sheet material 3 and a first buckle part 4; the first buckle part 4 is arranged at an edge of a surface of the cover sheet material 3; the first buckle part 4 is formed by performing injection molding on PLA or conventional plastic; the first buckle part 4 is formed at the edge of the surface of the cover sheet material 3 through the injection molding; and after being formed, the first buckle part 4 and the cover sheet material 3 are fused together.

Figure 1:
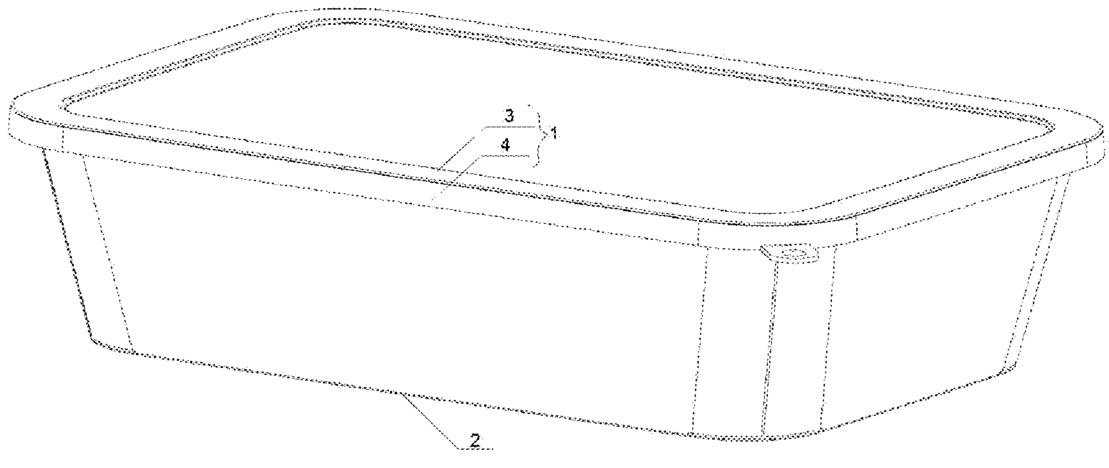
FIG. 1 is a schematic structural diagram of the present disclosure.
Figure 2:
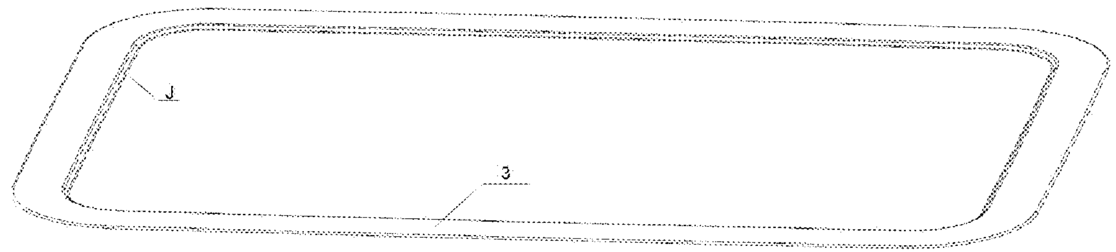
FIG. 2 is a schematic structural diagram after a cover sheet material is subjected to mold pressing.
Figure 3:
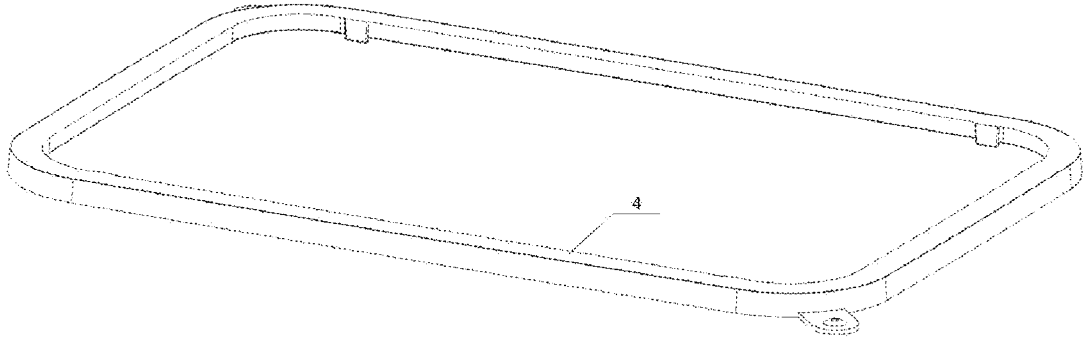
FIG. 3 is a schematic structural diagram of a first buckle part.
Figure 4:
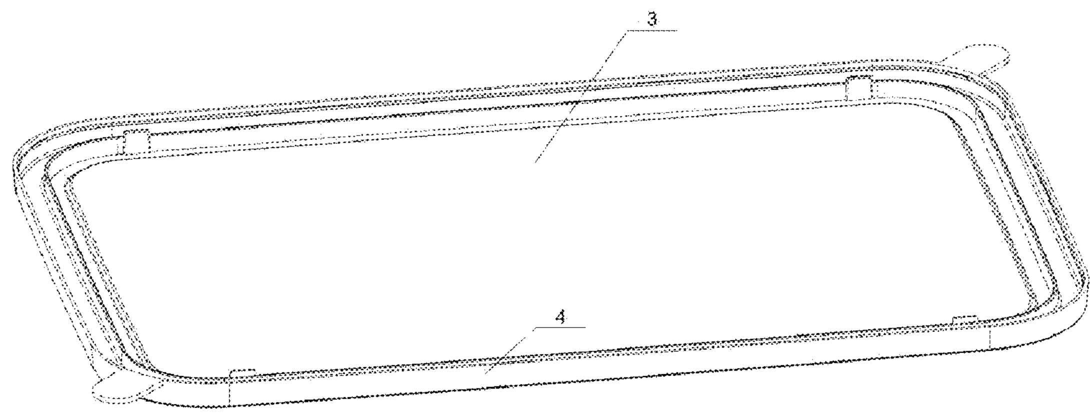
FIG. 4 is a schematic structural diagram of a cover body.
Figure 5:
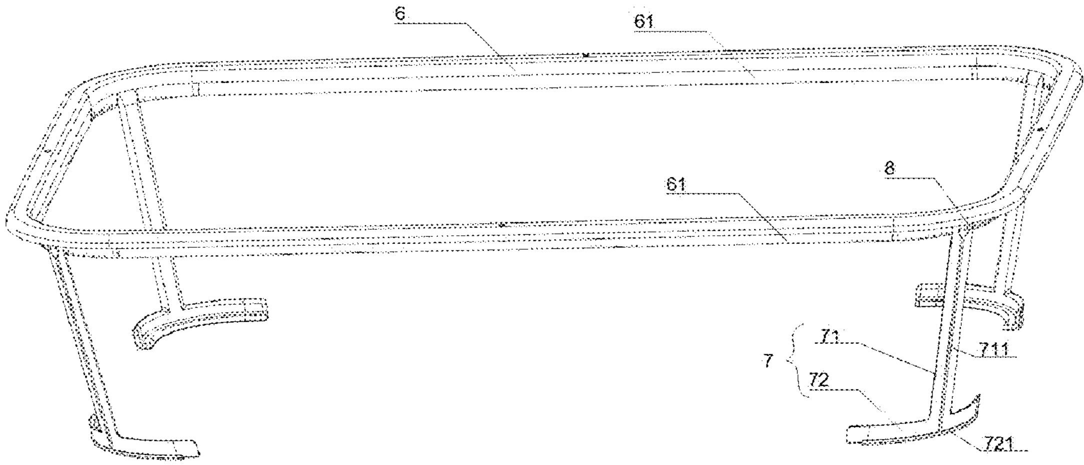
FIG. 5 is a schematic structural diagram of connecting a second buckle part to an angle frame.

The cover sheet material 3 may be prepared by performing a blow extrusion process on the PLA or the conventional plastic. A thickness of the cover sheet material is 2 decimillimetres to 35 decimillimetres, so that the cover sheet material is cut to reach the size. The concave-convex part at J in FIG. 2 is formed by a mold. Before being processed, the cover sheet material 3 is a flat thin sheet. The first buckle part 4 is in a frame shape. An outer contour of the first buckle part 4 is the same as an outer contour of the cover sheet material 3. After forming, a surface of the first buckle part 4 is fused together with a circumferential edge of the cover sheet material 3. The surface at a junction is very flat and smooth. The shape is the same as the shape of the cover body 1 integrally formed by the traditional plastic. However, the cover sheet material of the present disclosure is thinner, so that materials are saved.

As shown in FIG. 5, FIG. 6, FIG. 7, and FIG. 8, the box body 2 includes a box sheet material 5, a second buckle part 6, and angle frames 7; the box sheet material 5 includes a bottom surface 51 and four side surfaces 52 connected to the bottom surface 51; the box sheet material 5 is formed into a box by folding four side surfaces 52; four corners of the box are fixed and sealed through the angle frames 7; an edge of an opening part of the box are connected to the second buckle part 6; the second buckle part 6 is connected to the various angle frames 7; the second buckle part 6 and the angle frames 7 are integrally formed by injection molding; the second buckle part 6 are formed at the opening part of the box by injection molding; and the angle frames 7 are formed at the four corners of the box by injection molding. After forming, the second buckle part 6 is fused together with the edge of the opening part of the box, and the various angle frames 7 are fused together with the four corners of the box.

The box sheet material 5 is prepared by performing the blow extrusion process on the PLA or the conventional plastic. A thickness of the box sheet material is 2 decimillimetres to 35 decimillimetres, so that the box sheet material is cut to reach the size. Each second buckle part 6 is in a frame shape and has a circumferential flange 61. The circumferential flange 61 is fused together with the edge of the opening part of the box (namely, upper edges of the four side surfaces 52 after folding). The circumferential flange 61 plays a role of connecting the second buckle part 6 to the edge of the opening part of the box.

Each angle frame 7 includes a side frame 71 and a bottom frame 72; the side frame 71 is fused with edges of two corresponding adjacent side surfaces 52; a gap is reserved between the edges of the two adjacent side surfaces 52 after folding, and the two adjacent side surfaces are connected and sealed by the side frame 71; the bottom frame 72 is fused together with bottom edges (G in FIG. 10) of extending end portions of the two corresponding adjacent side surfaces 52 and a corresponding corner edge (H in FIG. 10) of the bottom surface 51; after folding, there are gaps between the bottom edges (G in FIG. 10) of the end portions of the two adjacent side surfaces 52 and a corresponding fillet (H in FIG. 10) of the bottom surface 51, so that the bottom edges and the fillet are connected and sealed by the bottom frame 72.

Figure 8:
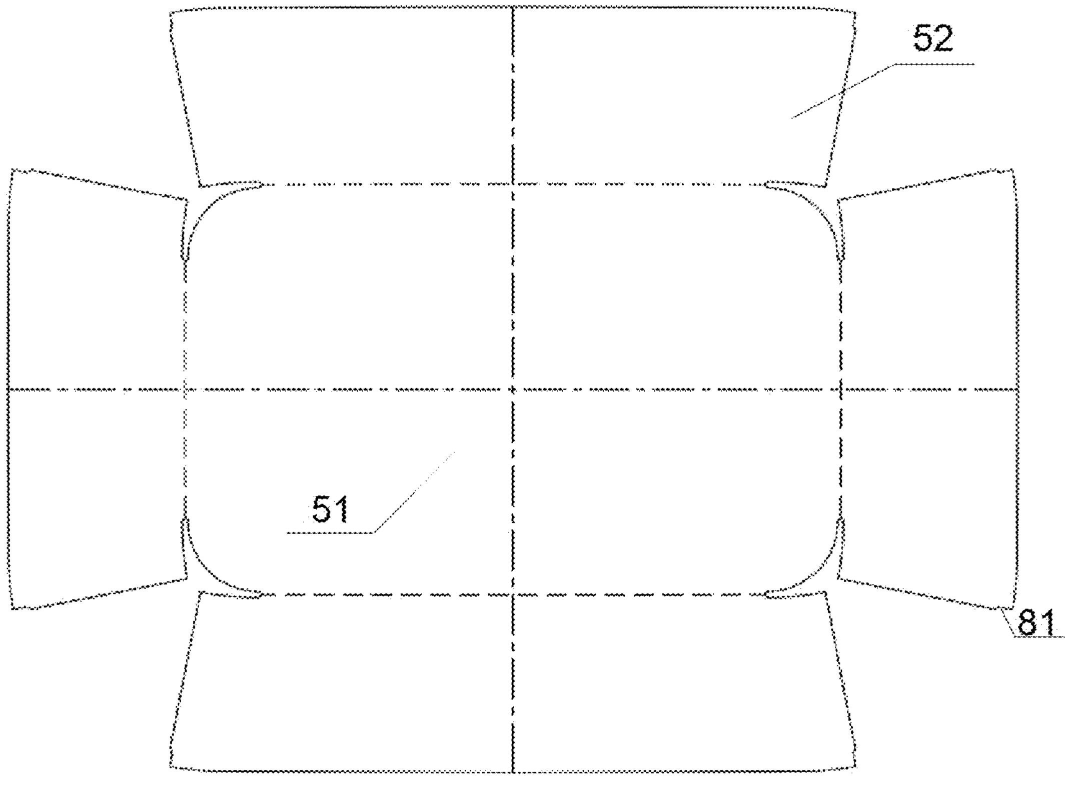
FIG. 8 is a schematic structural diagram of a box sheet material.

As shown in FIG. 8, specifically, the bottom surface 51 is square; four corners of the bottom surface 51 have fillets; two ends of a side surface 52 extend outwards to any adjacent two side surfaces 52*s*; after folding, the two ends are fused together with the side frame 71 along the corresponding fillets to seal junctions of the four side surfaces 52; the bottom frame 72 is in an arc shape; and the bottom frame 72 is fused together with bottom edges of end portions of two corresponding adjacent side surfaces 52 and the corresponding fillets of the bottom surface 51 to seal junctions of the four corners.

Figure 6:
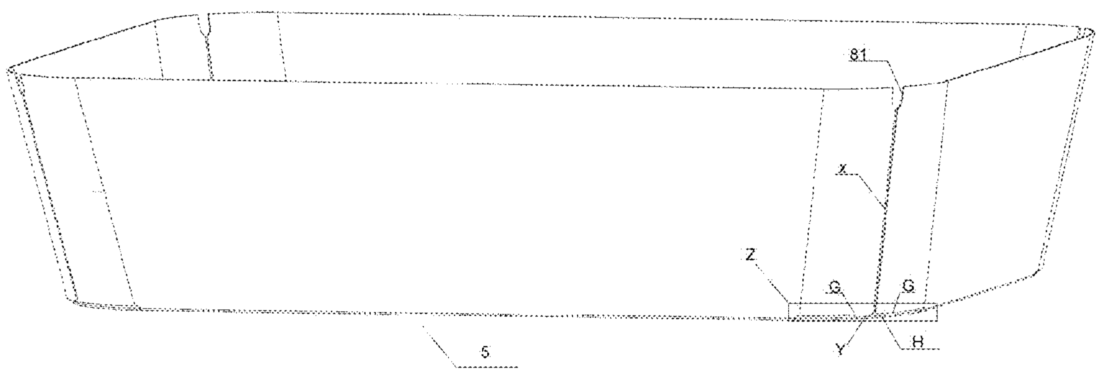
FIG. 6 is a schematic structural diagram after a box sheet material is subjected to mold pressing.
Figure 10:
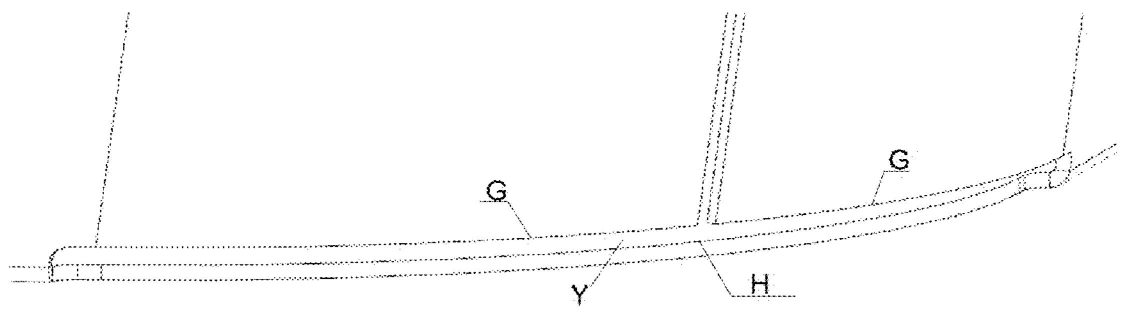
FIG. 10 is an enlarged diagram of the part Z of FIG. 6.

As shown in FIG. 6 and FIG. 10, reinforcing blocks 8 are arranged at four corners of the second buckle part 6; the reinforcing blocks 8 are respectively connected to the circumferential flange 61 and the corresponding angle frames 7; two sides of the side surfaces 52 are provided with unfilled corners 81; and the unfilled corners 81 of the two sides of two adjacent side surfaces 52 after folding form gaps that are matched with shapes of the reinforcing blocks 8. The gaps are avoiding positions for the reinforcing blocks 8. The reinforcing blocks further have a function. Although on an inner side surface, the second buckle part and the side frames are connected through the circumferential flange. A runner inside the mold enters a runner of the circumferential flange through a runner of the second buckle part and then enters runners of the side frames. On an outer side surface, the reinforcing blocks are connected to the circumferential flange and the corresponding angle frames respectively. Therefore, an entrance to the runners of the side frames is enlarged at the reinforcing blocks, thereby ensuring that the side frames and the bottom frames have no material shortage.

Figure 7:
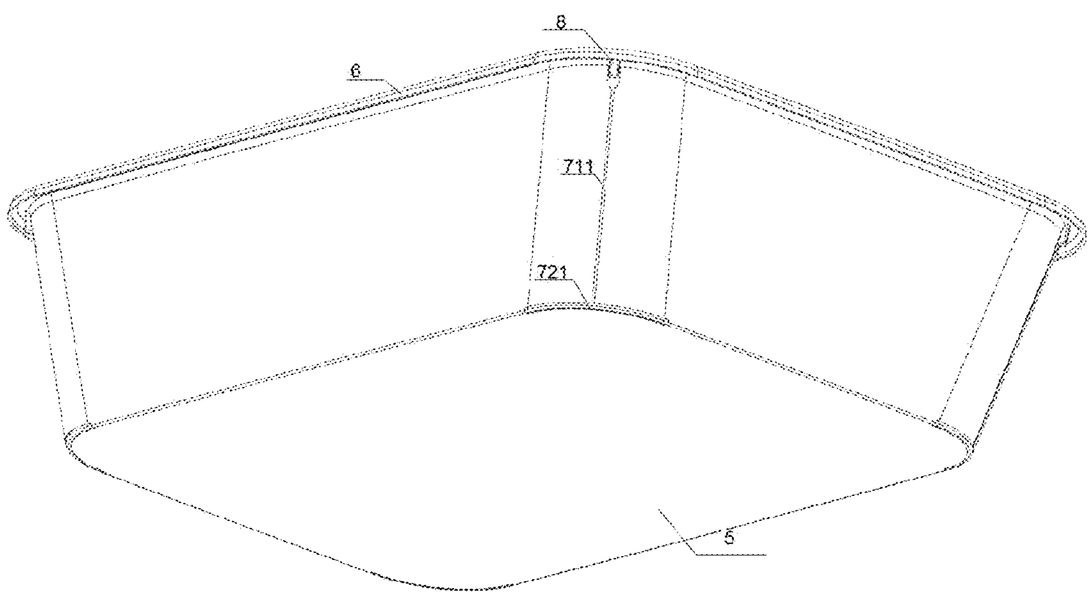
FIG. 7 is a schematic structural diagram of a box body.
Figure 9:
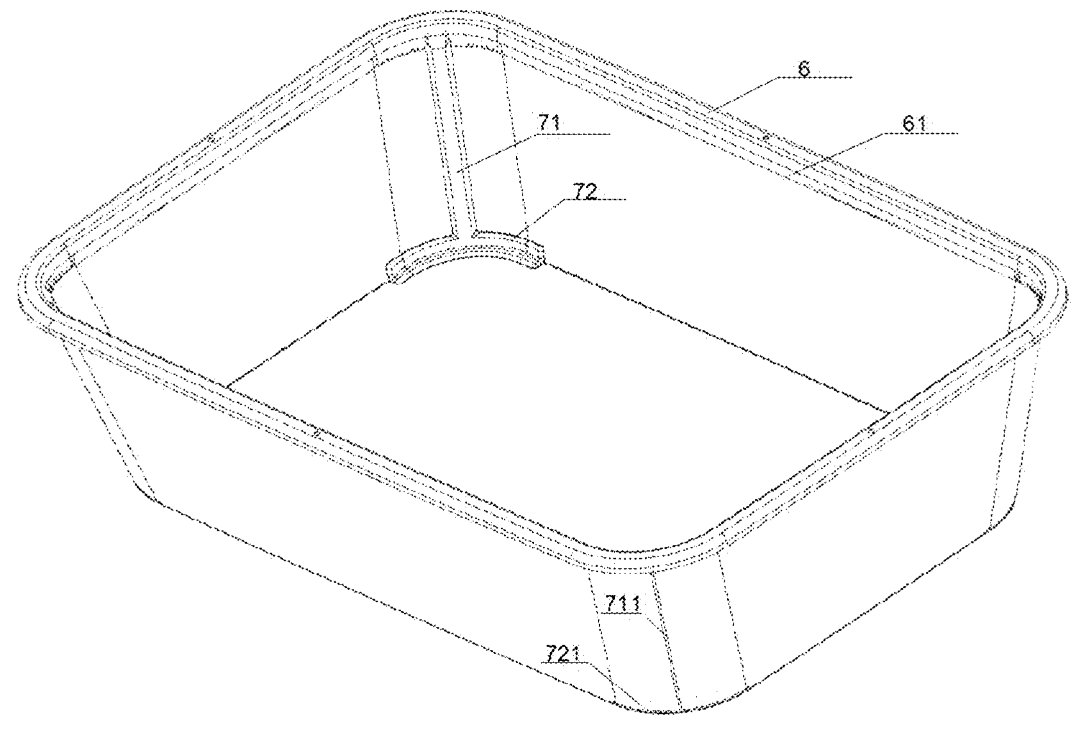
FIG. 9 is a schematic structural diagram showing that an angle frame protrudes out of a box body.

As shown in FIG. 7 and FIG. 9, first flush stiffening ribs 711 are arranged on the side frames 71; second flush stiffening ribs 721 are arranged on the bottom frames 72; the first flush stiffening ribs 711 are intersected with the second flush stiffening ribs 721; after folding, the edges of two adjacent side surfaces 52 resist against two sides of the corresponding first flush stiffening ribs 711; bottom edges of the end portions of the two adjacent side surfaces 52 resist against upper sides of the corresponding second flush stiffening ribs 721; and edges of the fillets of the bottom surface 51 resist against lower sides of the corresponding second flush stiffening ribs 721.

Considering that there is a gap (X in FIG. 6) after the edges of two adjacent side surfaces 52 resist against each other after folding, the first flush stiffening ribs 711 are provided for filling the gap. The side surfaces 52 and the bottom surface 51 have thicknesses. Considering that the edges of the end portions of two adjacent side surfaces 52 and the edges of the fillets of the bottom surface 51 after folding may form a space (Y in FIG. 10), the second flush stiffening ribs 721 are provided. This ensures the flatness of corner connections.

As shown in FIG. 9, after forming, the side frames 71 and the bottom frames 72 are respectively located at the four corners inside the box. The first flush stiffening ribs 711 and the second flush stiffening ribs 721 are located at the four corners outside the box. In the present disclosure, the novel packaging box is not formed at a time, but the product has excellent exterior flatness, which is infinitely close to the flatness of a product formed at a time.

Embodiment 2

The problem that material shortage is easily caused at a thin part during integrated injection molding of existing PLA because of poor flowability of the PLA is solved. A specific technical solution is as follows:

Comparative Example 1

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PLA by a blow extrusion process.

c: The mold was opened, and the cover sheet material 3 was placed into the mold.

d: The mold was closed, a surface temperature in a mold cavity was controlled at 150° C., and PLA was injected into the injection molding machine for molding for molding time of 5 S, wherein this step was mainly to form a first buckle part 4 on a surface of the cover sheet material 3 by fusion.

e: A finished cover body 1 was obtained.

Comparative Example 2

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PLA by a blow extrusion process.

c: The mold was opened, and the cover sheet material 3 was placed into the mold.

d: The mold was closed, a surface temperature in a mold cavity was controlled at 200° C., and PLA was injected into the injection molding machine for molding time of 2 S, wherein this step was mainly to form a first buckle part 4 on a surface of the cover sheet material 3 by fusion.

e: A finished cover body 1 was obtained.

Comparative Example 3

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PLA by a blow extrusion process.

c: The mold was opened, and the cover sheet material 3 was placed into the mold.

d: The mold was closed, a surface temperature in a mold cavity was controlled at 250° C., and PLA was injected into the injection molding machine for molding for molding time of 0.5 S, wherein this step was mainly to form a first buckle part 4 on a surface of the cover sheet material 3 by fusion.

e: A finished cover body 1 was obtained.

Comparative Example 4

A one-time-forming production process for a traditional cover body 1 specifically included the following steps:

a: A traditional mold was manufactured and was mounted in an injection molding machine.

b: The mold was closed, a surface temperature in a mold cavity was controlled at 250° C., and PLA was injected into the injection molding machine for molding for molding time of to 0.5 S.

c: A finished cover body 1 was obtained.

Comparative Example 5

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PET by a blow extrusion process.

c: The mold was opened, and the cover sheet material 3 was placed into the mold.

d: The mold was closed, a surface temperature in a mold cavity was controlled at 200° C., and PET was injected into the injection molding machine for molding for molding time of 2 S, wherein this step was mainly to form a first buckle part 4 on a surface of the cover sheet material 3 by fusion.

e: A finished cover body 1 was obtained.

Comparative Example 6

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from EVOH by a blow extrusion process.

c: The mold was opened, and the cover sheet material 3 was placed into the mold.

d: The mold was closed, a surface temperature in a mold cavity was controlled at 200° C., and EVOH was injected into the injection molding machine for molding for molding time of 2 S, wherein this step was mainly to form a first buckle part 4 on a surface of the cover sheet material 3 by fusion.

e: A finished cover body 1 was obtained.

Comparative Example 7

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PS by a blow extrusion process.

c: The mold was opened, and the cover sheet material 3 was placed into the mold.

d: The mold was closed, a surface temperature in a mold cavity was controlled at 200° C., and PS was injected into the injection molding machine for molding for molding time of 2 S, wherein this step was mainly to form a first buckle part 4 on a surface of the cover sheet material 3 by fusion.

e: A finished cover body 1 was obtained.

Comparative Example 8

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PE by a blow extrusion process.

c: The mold was opened, and the cover sheet material 3 was placed into the mold.

d: The mold was closed, a surface temperature in a mold cavity was controlled at 200° C., and PE was injected into the injection molding machine for molding for molding time of 2 S, wherein this step was mainly to form a first buckle part 4 on a surface of the cover sheet material 3 by fusion.

e: A finished cover body 1 was obtained.

Comparative Example 9

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PC by a blow extrusion process.

c: The mold was opened, and the cover sheet material 3 was placed into the mold.

d: The mold was closed, a surface temperature in a mold cavity was controlled at 200° C., and PC was injected into the injection molding machine for molding for molding time of 2 S, wherein this step was mainly to form a first buckle part 4 on a surface of the cover sheet material 3 by fusion.

e: A finished cover body 1 was obtained.

Comparative Example 10

A production process for a cover body 1 of a packaging box specifically included the following steps:

a: A mold was manufactured and was mounted in an injection molding machine.

b: A cover sheet material 3 with a corresponding size was obtained by cutting, wherein a thickness of the cover sheet material was 2 decimillimetres to 35 decimillimetres, and the cover sheet material was prepared from PMMA by a blow extrusion process.

c: The mold was opened, and the cover sheet material 3 was placed into the mold.

d: The mold was closed, a surface temperature in a mold cavity was controlled at 200° C., and PMMA was injected into the injection molding machine for molding for molding time of 2 S, wherein this step was mainly to form a first buckle part 4 on a surface of the cover sheet material 3 by fusion.

e: A finished cover body 1 was obtained.

There were 20 finished products respectively prepared in comparative example 1 to comparative example 10. Particles for injection molding were milk white. They were compared in aspects such as the appearance, the color, and the flatness of connections.

TABLE I

The finished products in comparative example 1 to comparative example 10 were compared in the aspects such as the appearance, the color, and the flatness of connections

| | Appearance defect | Color | Flatness of connection |
|---|---|---|---|
| Comparative example 1 | None | Milk white | Flat |
| Comparative example 2 | None | Milk white | Flat |
| Comparative example 3 | None | Milk white | Flat |

TABLE I-continued

The finished products in comparative example 1 to comparative example 10 were compared in the aspects such as the appearance, the color, and the flatness of connections

| | Appearance defect | Color | Flatness of connection |
|---|---|---|---|
| Comparative example 4 | Material shortage at a thin part of the cover body 1 (except the first buckle part 4) | Milk white | — |
| Comparative example 5 | None | Milk white | Flat |
| Comparative example 6 | None | Milk white | Flat |
| Comparative example 7 | None | Milk white | Flat |
| Comparative example 8 | None | Milk white | Flat |
| Comparative example 9 | None | Milk white | Flat |
| Comparative example 10 | None | Milk white | Flat |

Embodiment 3

The problem that material shortage is easily caused at a thin part during integrated injection molding of existing PLA because of poor flowability of the PLA is solved. A specific technical solution is as follows:

Comparative Example 11

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PLA by a blow extrusion process.

C: The mold was opened, and the box sheet material 5 was placed into the mold.

D: The mold was closed; four side surfaces 52 were folded into a box by pressing by the mold; a surface temperature in a mold cavity was controlled at 150° C.; PLA was injected into the injection molding machine for molding for molding time of 5 S, wherein this step was mainly to form a second buckle part 6 at an opening part of the box by fusion and form angle frames 7 at corners of the box by fusion.

E: A finished box body 2 was obtained.

Comparative Example 12

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PLA by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PLA was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 13

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PLA by a blow extrusion process.

C: The mold was opened, and the box sheet material 5 was placed into the mold.

D: The mold was closed; four side surfaces 52 were folded by pressing by the mold; a surface temperature in a mold cavity was controlled at 250° C.; PLA was injected into the injection molding machine for molding for molding time of 0.5 S, wherein this step was mainly to form a second buckle part 6 at an opening part of the box by fusion and form angle frames 7 at corners of the box by fusion.

E: A finished box body 2 was obtained.

Comparative Example 14

A one-time-forming production process for a traditional box body 2 specifically included the following steps:

A: A mold was manufactured and was mounted in an injection molding machine.

B: The mold was closed; four side surfaces 52 were folded by pressing by the mold; a surface temperature in a mold cavity was controlled at 250° C.; and PLA was injected into the injection molding machine for molding for molding for molding time of 0.5 S.

C: A finished box body 2 was obtained.

Comparative Example 15

Comparative example 15 was basically the same as comparative example 12, but there was an only difference that there were no reinforcing blocks 8 in the finished product, that is, positions of the reinforcing blocks 8 in the mold were filled.

Comparative Example 16

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PET by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PET was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 17

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from EVOH by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; EVOH was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 18

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PS by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PS was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 19

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PE by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PE was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 20

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PC by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PC was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

Comparative Example 21

A production process for a box body 2 of a packaging box specifically included the following steps:

A: A mold was manufactured and was mounted in an injection molding machine.

B: A cover sheet material 5 with a corresponding size was obtained by cutting, wherein a thickness of the cover sheet material was 2 decimillimetres to 35 decimillimetres, and the cover sheet material was prepared from PMMA by a blow extrusion process.

C: The mold was opened, and the box sheet material 5 was placed into the mold.

D: The mold was closed; four side surfaces 52 were folded by pressing by the mold; a surface temperature in a mold cavity was controlled at 200° C.; PMMA was injected into the injection molding machine for molding for molding time of 2 S, wherein this step was mainly to form a second buckle part 6 at an opening part of the box by fusion and form angle frames 7 at corners of the box by fusion.

E: A finished box body 2 was obtained.

There were 20 finished products respectively prepared in comparative example 11 to comparative example 21. Particles for injection molding were milk white. They were compared in aspects such as the appearance, the color, and the flatness of connections.

TABLE II

The finished products in Embodiment 11 to Embodiment 21 were compared in the aspects such as the appearance, the color, and the flatness of connections

| | Appearance defect | Color | Flatness of connection |
|---|---|---|---|
| Comparative example 11 | None | Milk white | Flat |
| Comparative example 12 | None | Milk white | Flat |
| Comparative example 13 | None | Milk white | Flat |
| Comparative example 14 | Material shortage at a thin part of the box body 2 (except the second buckle part 6) | Milk white | — |
| Comparative example 15 | Material shortage at a bottom frame 72 | Milk white | Not flat |
| Comparative example 16 | None | Milk white | Flat |
| Comparative example 17 | None | Milk white | Flat |
| Comparative example 18 | None | Milk white | Flat |
| Comparative example 19 | None | Milk white | Flat |
| Comparative example 20 | None | Milk white | Flat |
| Comparative example 21 | None | Milk white | Flat |

Of course, the above only describes the typical examples of the present disclosure. In addition, the present disclosure can also have a variety of other specific implementations, and any technical solutions formed by equivalent replacement or equivalent transformation shall all fall within the scope of protection claimed in the present disclosure.

What is claimed is:

1. A packaging box, comprising a cover body and a box body, wherein the cover body is detachably buckled with the box body; the cover body comprises a cover sheet material and a first buckle part; the first buckle part is arranged at an edge of a surface of the cover sheet material; the first buckle part is formed by injection molding at the edge of the surface of the cover sheet material;

the box body comprises a box sheet material, a second buckle part, and angle frames; the box sheet material comprises a bottom surface and four side surfaces connected to the bottom surface; the box sheet material is formed into a box by folding four side surfaces; four corners of the box are fixed and sealed through the angle frames; an edge of an opening part of the box is connected to the second buckle part; the second buckle part is connected to the angle frames; the second buckle part and the angle frames are integrally formed by injection molding; the second buckle part is formed at the opening part of the box by injection molding; the angle frames are formed at the four corners of the box by injection molding; each angle frame comprises a side frame and a bottom frame; the side frame is fused with edges of two corresponding adjacent side surfaces; and the bottom frame is fused with bottom edges of two corresponding adjacent side surfaces and a corresponding corner edge of the bottom surface;

wherein the bottom surface is square; four corners of the bottom surface have fillets; two ends of a side surface extend outwards to any adjacent two side surfaces; after folding, the two ends are fused together with the side frame along corresponding fillets to seal junctions of the four side surfaces; the bottom frame is in an arc shape; and the bottom frame is fused together with bottom edges of end portions of two corresponding adjacent side surfaces and edges of the corresponding fillets of the bottom surface to seal junctions of the four corners; and wherein first flush stiffening ribs are arranged on the side frames; second flush stiffening ribs are arranged on the bottom frames; the first flush stiffening ribs are intersected with the second flush stiffening ribs; after folding, the edges of two adjacent side surfaces resist against two sides of the corresponding first flush stiffening ribs; bottom edges of the end portions of the two adjacent side surfaces resist against upper sides of the corresponding second flush stiffening ribs; and edges of the fillets of the bottom surface resist against lower sides of the corresponding second flush stiffening ribs.

2. The packaging box according to claim 1, wherein the first buckle part is in a frame shape; an outer contour of the first buckle part is the same as an outer contour of the cover sheet material; and after forming, a surface of the first buckle part is fused together with a circumferential edge of the cover sheet material.

3. The packaging box according to claim 1, wherein the second buckle part is in a frame shape and has a circumferential flange; and the circumferential flange is fused together with the edge of the opening part of the box.

4. The packaging box according to claim 1, wherein reinforcing blocks are arranged at four corners of the second buckle part; the reinforcing blocks are respectively connected to a circumferential flange and an angle frame; two sides of the side surfaces are provided with unfilled corners; and the unfilled corners of the two sides of two adjacent side surfaces after folding form gaps that are matched with shapes of the reinforcing blocks.

5. The packaging box according to claim 1, wherein a thickness of the cover sheet material is 2 decimillimetres to 35 decimillimetres; and a thickness of the box sheet material is 2 decimillimetres to 35 decimillimetres.

* * * * *